(12) United States Patent
Kim et al.

(10) Patent No.: US 8,150,451 B2
(45) Date of Patent: Apr. 3, 2012

(54) PORTABLE TERMINAL

(75) Inventors: Chang-Il Kim, Gyeonggi-do (KR);
Hyun-Seock Song, Seoul (KR);
Jae-Gon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 675 days.

(21) Appl. No.: 12/269,660

(22) Filed: Nov. 12, 2008

(65) Prior Publication Data

US 2009/0124306 A1 May 14, 2009

(30) Foreign Application Priority Data

Nov. 12, 2007 (KR) .......................... 10-2007-0115087

(51) Int. Cl.
*H04M 1/00* (2006.01)
(52) U.S. Cl. ............... 455/550.1; 455/575.5; 455/575.6; 455/575.7; 455/129; 434/702; 434/745; 434/895; 434/833; 434/748

(58) Field of Classification Search ............... 455/550.1, 455/575.5, 575.6, 575.7, 129; 434/702, 745, 434/895, 833.748
See application file for complete search history.

(56) References Cited

U.S. PATENT DOCUMENTS

| | | | |
|---|---|---|---|
| 6,107,970 A * | 8/2000 | Holshouser et al. | 343/702 |
| 6,549,789 B1 * | 4/2003 | Kfoury | 455/550.1 |
| 6,765,536 B2 * | 7/2004 | Phillips et al. | 343/702 |
| 7,555,322 B2 * | 6/2009 | Shimamura et al. | 455/575.3 |
| 2003/0132884 A1 * | 7/2003 | Ragner et al. | 343/702 |
| 2006/0009156 A1 * | 1/2006 | Hayes et al. | 455/63.1 |
| 2008/0254836 A1 * | 10/2008 | Qi et al. | 455/566 |

* cited by examiner

*Primary Examiner* — Edward Urban
*Assistant Examiner* — Ganiyu Hanidu
(74) *Attorney, Agent, or Firm* — Birch, Stewart, Kolasch & Birch, LLP (57) ABSTRACT

A portable terminal is capable of enhancing a Hearing Aid Compatibility (HAC) rating by having an arrangement to shift a peak region of an electromagnetic field occurring at the time of a wireless communication in a call mode, to a position far from a measuring region.

6 Claims, 6 Drawing Sheets

FIG. 8

PORTABLE TERMINAL

RELATED APPLICATION

The present disclosure relates to subject matter contained in priority Korean Application No. 10-2007-0115087, filed on Nov. 12, 2007, which is herein expressly incorporated by reference in its entirety.

BACKGROUND OF THE INVENTION

1. Field of the Invention

The present invention relates to a portable terminal, and more particularly, to a portable terminal having a means to shift an electromagnetic wave emission region away from an audio output unit so as to enhance a Hearing Aid Compatibility (HAC) rating.

2. Background of the Invention

In general, a portable terminal serves as a portable device having one or more functions such as enabling voice and video calls, permitting information input/output, and providing data storage.

As the portable terminal now provides many additional services beside the basic call service, a user can capture photos or moving images, reproduce music or moving image files, play games, receive broadcasting programs, and so on. The portable terminal is implemented as a multimedia player.

During wireless communication, an electromagnetic field exists around the portable terminal. Various attempts are being performed in order to minimize damage to a user's health due to the electromagnetic field, or to minimize interference between the portable terminal and an external device.

SUMMARY OF THE INVENTION

Therefore, a first object of the present invention is to provide a portable terminal capable of enhancing a Hearing Aid Compatibility (HAC) rating.

A second object of the present invention is to provide a portable terminal capable of enhancing a HAC rating even when there is a difficulty in reducing a strength of a peak region of an electromagnetic field.

A third object of the present invention is to provide a portable terminal capable of simply enhancing a HAC rating by positioning a peak region of an electromagnetic field far from a measuring region.

To achieve these and other advantages and in accordance with the purpose of the present invention, as embodied and broadly described herein, there is provided a portable terminal, comprising: a body having an audio output unit and an antenna forming an electromagnetic field; a peak shift unit electrically connected to the antenna, for shifting a peak region of the electromagnetic field to a position farther from the audio output unit when the peak shift unit is activated than when the peak shift unit is non-activated; and a controller configured to place the portable terminal in a call mode when the peak shift unit is activated.

The peak shift unit may be implemented as a conductive member having one end connected to the antenna, the conductive member being movable toward and away from the antenna.

The audio output unit may be mounted to the body so as to be exposed out through one surface of the body, and the conductive member may be formed at another surface facing the one surface.

The conductive member may be formed at a sliding unit slidably mounted to the body.

The sliding unit may be formed so as to cover a portion of a main surface of the body not adjacent to the conductive member.

The conductive member may be formed at a rotating unit rotatably mounted to the body.

The peak shift unit may be implemented as a conductive bar detachably coupled to the conductive unit so that the peak region is moved, by a free end of the conductive bar, to a farther position than the end region from the audio output unit.

The audio output unit may be mounted to the body so as to be exposed out through one surface of the body, and the conductive bar may be configured to be coupled to a portion proximate to another surface facing the one surface.

The conductive unit may be implemented as a ground to which the antenna is grounded.

The portable terminal may be operated in a call mode in connection with an operation of the peak shift unit.

A current mode of the body is converted into a call mode when the peak region is shifted by the peak shift unit.

The body includes a display for visually outputting information and allowing information to be input thereon in a touch manner, and, in the call mode, the display may be in a status that numbers can be input thereon.

When the peak shift unit is operated while a call is incoming, the portable terminal is operated in a call mode.

The body may include an alarming unit informing a user that the peak shift unit is not operated when in the call mode. Accordingly, a hearing aid wearer is provided with an indication in order to avoid being exposed to undesirable circumstances.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a portable terminal according to the present invention will be explained in more detail. The same reference numerals will be given to the same or similar parts in different embodiments, and their detailed explanation will be omitted.

The US Hearing Aid Compatibility (HAC) Act serves to test and ensure compatibility between a wearer's hearing aid and a portable terminal without interference with each other. The HAC Act is being applied to manufacturers for wireless devices such as hearing aids and portable terminals. The HAC Act was legislated by the Federal Communications Commission (FCC). In the United States, manufacturers of wireless devices are required to ensure manufactured products for sales meet certain ratings.

A method for measuring a HAC rating of a portable terminal will be explained with reference to FIG. 1.

A portable terminal (M) is fixed onto a supporting member, and a strength of an electromagnetic wave in a call mode (when the receiver is activated) is measured by a probe used to measure an E-field or an H-field, or the like.

A measuring region (E) is a square-shaped region (5 cm×5 cm) formed based on the center of the audio output unit (R), and corresponds to a region on a virtual plane in a space 1 cm from the surface of the portable terminal (M). The measuring region (E) is divided into 9 sub-regions (1-9) in the form of a grid.

In order to measure a HAC rating, electromagnetic waves of the sub-regions (1-9) are measured, excluding the center sub-region (5) and three sub-regions having relatively high field strengths of electromagnetic waves. That is, a highest field strength of electromagnetic waves measured with respect to the remaining five sub-regions serves as a peak value to determine a HAC rating. As a result, a rating labeled within a range including the peak value is determined as a HAC rating of the portable terminal (M).

The HAC ratings are categorized into 'M' ratings (M1 to M4, 'M4' is the best) with respect to radio frequency (RF) interference, and 'T' ratings (T1 to T4: 'T4' is the best) with respect to an inductive coupling. Since the 'M' ratings are more dominant than the 'T' ratings, a method for enhancing the 'M' ratings will be explained in more detail.

Figure 2:
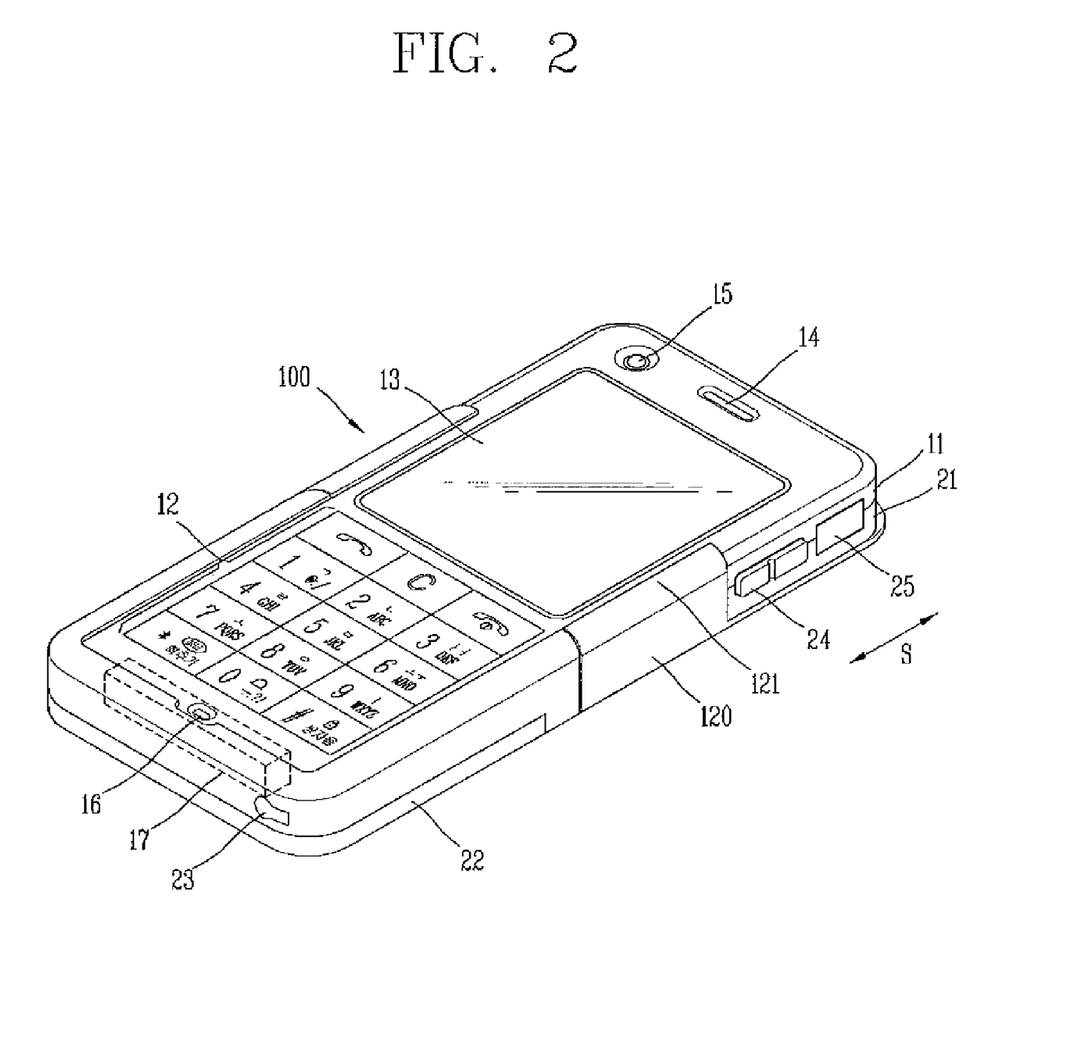
FIG. 2 is a front perspective view showing a portable terminal according to a first embodiment of the present invention.

FIG. 2 is a front perspective view showing a portable terminal according to a first embodiment of the present invention.

A body of the portable terminal includes a case (casing, housing, cover, or the like) that forms an external appearance of the portable terminal. The portable terminal according to the present invention is not limited to the bar-type portable terminal shown in FIG. 2, but may be applied to various types such as a slide type, a folder type, a swing type, or the like.

The case may be divided into a front case 11 and a rear case 21. Various electronic components are mounted in a space formed by the front case 11 and the rear case 21. One or more intermediate cases may be arranged between the front case 11 and the rear case 21. The front and rear cases 11 and 21 may be formed by injection-molding synthetic resin, or formed using metallic material such as stainless steel (STS), or titanium (Ti).

The front case 11 may include a first user input unit 12, a display 13, a first audio output unit 14, a first video input unit 15, an audio input unit 16, or the like.

The first user input unit 12 receives commands to control the operation of the portable terminal.

The display 13 for visually displaying information may include a Liquid Crystal Display (LCD), an Organic Light Emitting Diodes (OLED) display, or the like. The display 13 may further include a touch screen through which a user can input information in a touch manner.

The first audio output unit 14 outputs sound such as another party's voice, and is sometimes referred to as a 'receiver'.

The first video input unit 15 may be implemented as a camera module to capture a user's still or moving images.

The audio input unit 16 may be implemented as a microphone to receive a user's voice or other sound, or the like.

A power supplying unit 22, a broadcasting signal receiving antenna 23, a second user input unit 24, an interface 25, or the like, may be disposed at the rear case 21 mounted to a rear surface of the portable terminal.

The power supplying unit 22 is mounted to the rear case 21, and supplies power to the portable terminal. The power supplying unit 22 may be implemented as a rechargeable battery, and may be detachably mounted to the outside of the portable terminal.

A broadcast signal receiving antenna 23 may be disposed at one side of the rear case 21, in addition to an antenna 17 for communications. The antenna 23 may be configured to retract into the rear case 21.

The second user input unit 24 may be installed on a side surface of the rear case 21. The first user input unit 12 and the second user input unit 24 may be referred to as 'manipulating units', and any types of user input units that can input information in a tactile manner may be implemented. The user input units may be implemented as dome switches or a touch screen, or a touch pad that can receive commands or information in a user's push or touch manner, or may be implemented as jog wheels and jog switches.

The first user input unit 12 may serve to input various commands such as numbers or text messages, or symbols, or such as start, stop, and scroll commands. The second user input unit 24 may serve as hot keys to perform a specific function to activate the first video input unit 15, as well as a scroll function.

The interface 25 may serve as a passage through which the portable terminal of the present invention can exchange data with external devices. The interface 25 may be implemented by wire or by radio, and may include one of an access port to an earphone, a short-range communication port (e.g., IrDA port), a Bluetooth port, a wireless LAN port, and a power supply port for supplying power to the portable terminal. The interface 25 may be a card socket for receiving an external card such as a subscriber identification module (SIM), a User Identification Module (UIM), and a memory card for storing information.

Figure 3:
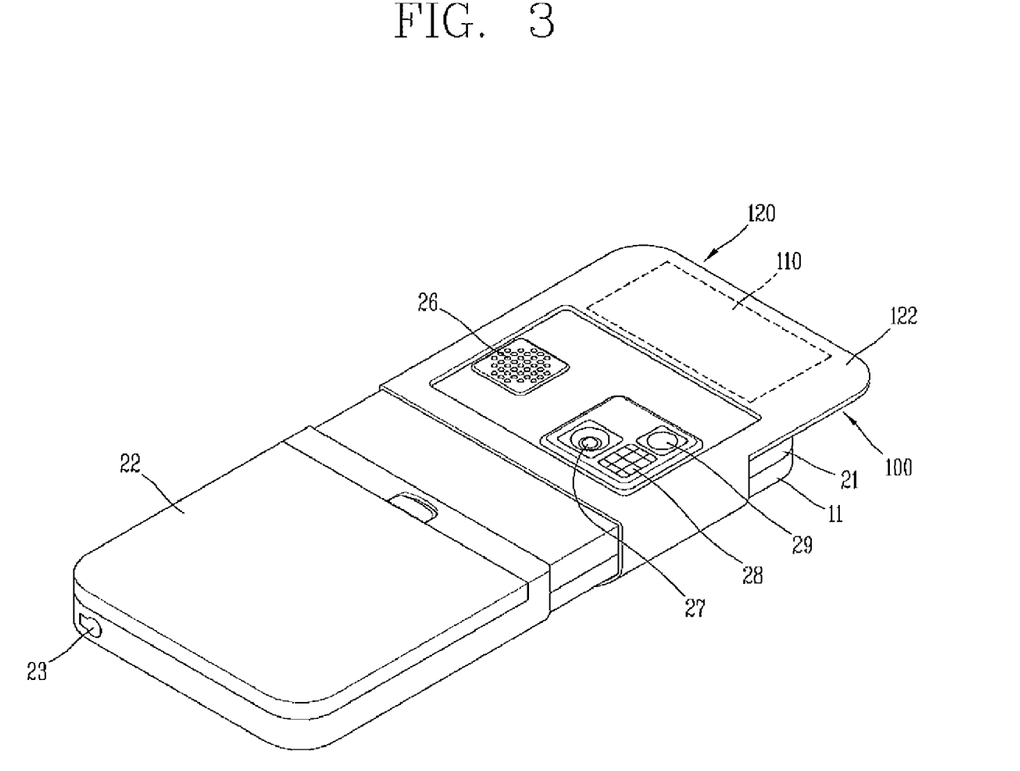
FIG. 3 is a rear perspective view showing the portable terminal according to a first embodiment of the present invention.

FIG. 3 is a rear perspective view showing the portable terminal of FIG. 2.

Referring to FIG. 3, a second audio output unit 26 and a second video input unit 27 may be additionally disposed at the rear case 21.

The second audio output unit 26 may cooperate with the first audio output unit 14 (refer to FIG. 2) to provide stereo output. Also, the second audio output unit 26 may be configured to operate as a speakerphone. In this case, the second audio output unit 26 may also be referred to as 'receiver', like the first audio output unit 14.

The second video input unit 27 faces a direction opposite to that faced by the first video input unit 15 (refer to FIG. 2). And, the second video input unit 27 may be a camera having capabilities different from those of the first video input unit 15. The first video input unit 15 may operate with a relatively lower resolution so that a user's face captured during a video conference can be directly transmitted to another party. On the contrary, the second video input unit 27 may operate with a relatively higher resolution since a captured image is not directly transmitted to another party.

A flash 28 and a mirror 29 are additionally arranged near the second video input unit 27. The flash 28 provides light to a subject to be captured by the second video input unit 27, and the mirror 29 is useful for assisting a user to position the second video input unit 27 in a self-portrait mode.

So far, it was explained that the first user input unit 12 was mounted to the front case 11, whereas the second user input unit 24 was mounted to the rear case 21. However, the second user input unit 24 may be disposed at the front case 11 so as to be adjacent to the first user input unit 12. If the second video input unit 27 is not provided, the first video input unit 15 may be rotatably mounted to capture images that would have been captured by the second video input unit 27 if it were present.

Figure 4:
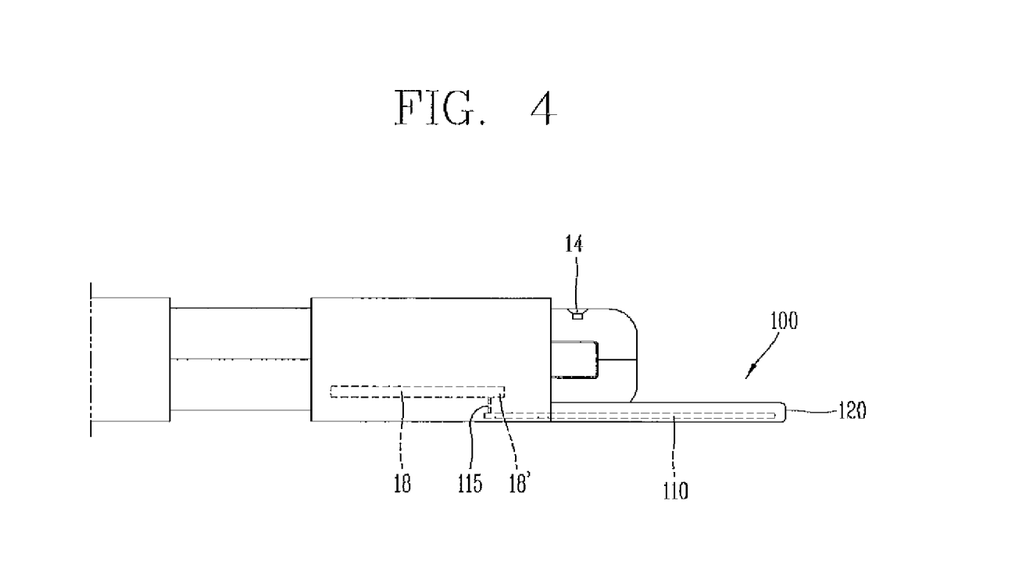
FIG. 4 is a schematic longitudinal section view showing the portable terminal of FIG. 3.

Referring to FIG. 4, which is a schematic longitudinal section view of FIG. 3, and referring to FIGS. 2 and 3, a peak shift unit 100 is movably coupled to the body of the portable terminal. The peak shift unit 100 may be configured to cover a part of the body. The peak shift unit 100 is configured so that a conductive member can be shifted far from the audio output unit 14 when the audio output unit 14 is activated. A conductive unit, e.g. a ground 18, is electrically connected to the antenna 17 inside the body, and may form a peak region (a region having a peak value) of an E-field occurring due to an electromagnetic wave emission at an end region 18' of the ground 18. FIG. 2 is a view showing a state before the peak shift unit 100 is folded (not deployed), and FIG. 3 is a view showing a state after the peak shift unit 100 is unfolded (deployed).

The peak shift unit 100 includes a conductive member 110 that is movable far from the audio output unit 14, in an electrically-connected state to the end region 18'. In order to move the conductive member 110, the peak shift unit 100 may further include a sliding unit 120 slidably coupled to the body along a sliding direction (S). The conductive member 110 disposed at the sliding unit 120 is electrically connected to the ground 18 by a contact pin 115 even during a sliding motion.

A front region 121 of the sliding unit 120 covers the front case 11, whereas a rear region 122 of the sliding unit 120 covers the rear case 21. The front region 121 may serve as a region through which a user manipulates the sliding unit 120 in a sliding manner.

Preferably, the conductive member 110 is formed at the rear region 122 of the sliding unit 120, and is disposed far from the audio output unit 14 exposed through the front case 11. The reason is in order to minimize influence of a free end of the conductive member 110 on the measuring region (E), by positioning the free end far from the measuring region (E, refer to FIG. 1) along a thickness direction of the portable terminal. Here, the free end serves as a new end region that is connected to the ground 18 and emitting an electromagnetic wave.

Figure 5A:
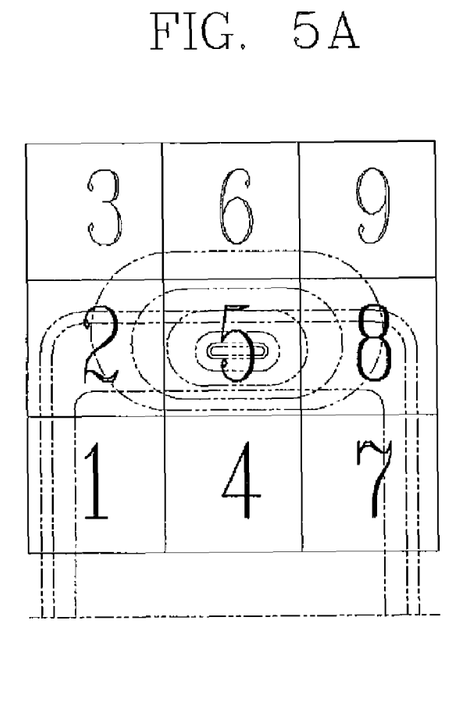
FIG. 5A is a conceptual view showing an E-field distribution in a state where a peak shift unit is folded (unshifted)
Figure 5B:
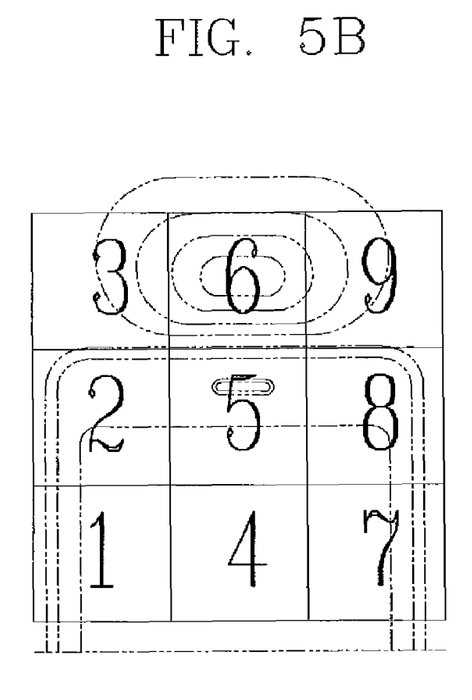
FIG. 5B is a conceptual view showing an E-field distribution in a state where the peak shift unit is unfolded (shifted)

FIG. 5A is a conceptual view showing an E-field distribution in a state where the peak shift unit 100 is folded (not shifted), and FIG. 5B is a conceptual view showing an E-field distribution is a state where the peak shift unit 100 is unfolded (shifted).

As shown in FIG. 5A (also refer to FIG. 2), an E-field has a relatively high strength at the sub-regions 2, 3, 5, 6, 8 and 9 near the audio output unit 14. Also, the E-field has a strength higher than a certain level at the sub-regions 1, 3, 4, 7 and 9 excluding the center sub-region 5, and excluding the three sub-regions 2, 6, and 8 having a relatively high E-field strength. As a result, a low HAC rating, e.g., 'M2' may be implemented.

In a non-call mode, it is preferable not to deploy the peak shift unit 100 in spite of a low HAC rating, because a wearer's hearing aid is not directly influenced by the portable terminal. This allows the portable terminal to have a compact configuration and an enhanced portable characteristic.

When the peak shift unit 100 is unfolded by sliding away from the body (refer to FIGS. 3 and 4), electromagnetic wave emission mainly occurs at the free end of the conductive member 110 connected to the end region 18', rather than the end region 18' of the ground 18.

In this case, as shown in FIG. 5B, the sub-regions having a high E-field strength are shifted to the sub-regions 3, 6 and 9 of the measuring region (E). As a result, once the center sub-region 5 and the upper sub-regions 3, 6 and 9 are excluded, there scarcely exist the sub-regions having a high E-field strength.

Accordingly, the E-field by the other sub-regions 1, 2, 4, 7 and 8 has a peak value smaller than that when the peak shift unit 100 is folded. As a result, when the peak shift unit 100 is unfolded by a sliding motion, a HAC rating higher than that when the peak shift unit 100 is folded, e.g., 'M3' or 'M4', may be obtained.

Figure 6:
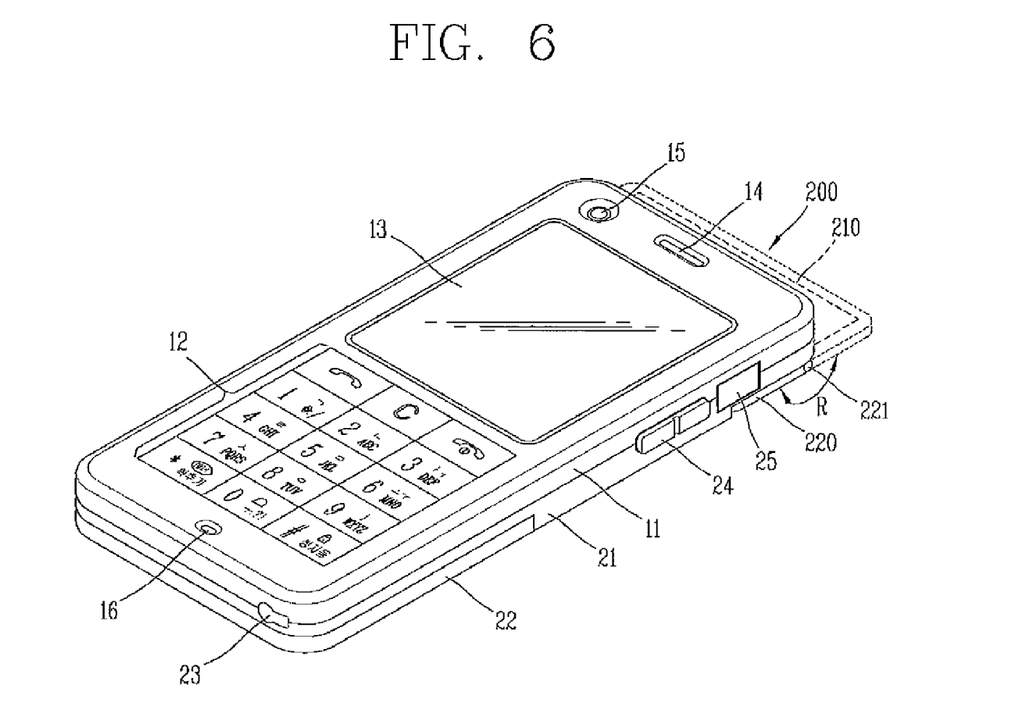
FIG. 6 is a perspective view showing a peak shift unit according to a second embodiment of the present invention.

FIG. 6 is a perspective view showing a peak shift unit according to a second embodiment of the present invention.

Referring to FIG. 6, a peak shift unit 200 includes a conductive member 210 electrically connected to the conductive unit 18 (refer to FIG. 4), and unfolded by being rotated far from the audio output unit 14.

In order to open the peak shift unit 200, the peak shift unit 200 may be coupled to the body by a rotation shaft 221 so as to be rotatable in one direction (R), and may include a rotation unit 220 where the conductive member 210 is formed. Here, the rotation unit 220 is preferably formed at the rear case 21 rather than the front case 11, so that an electromagnetic field can be formed at a position far from the measuring region (E) in a thickness direction of the portable terminal.

As a user manipulates the rotation unit 220 in the direction (R), the rotation unit 220 can be rotated. Here, the user can more conveniently manipulate the rotation unit 220 by applying a spring to the rotation shaft 221, or by applying a cam unit used for a hinge portion of a folder-type portable terminal.

In this embodiment, when the peak shift unit 200 connected to the conductive unit is unfolded so as to be spaced from the audio output unit 14, regions having a high 'E'-field are shifted to the upper sub-regions of the measuring region (E). As a result, a HAC rating is enhanced when the peak shift unit 200 is unfolded, rather than when the peak shift unit 200 is folded.

Figure 7:
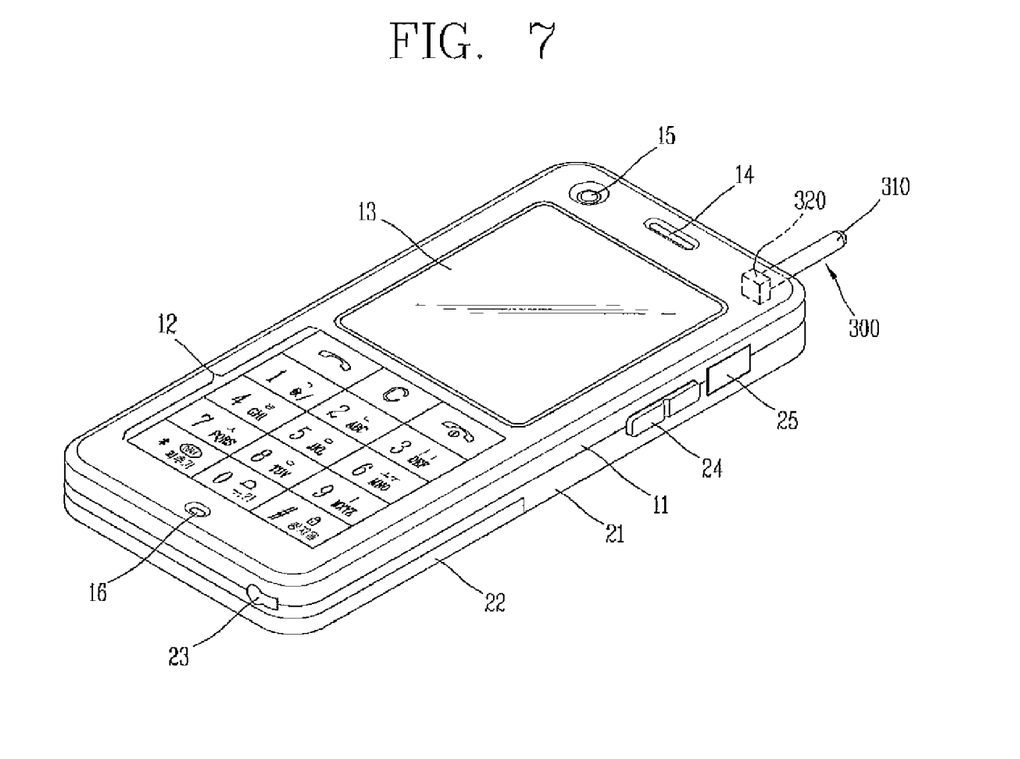
FIG. 7 is a perspective view showing a peak shift unit according to a third embodiment of the present invention.

FIG. 7 is a perspective view showing a peak shift unit 300 according to a third embodiment of the present invention.

Referring to FIG. 7, the peak shift unit 300 may be implemented as a conductive bar 310 detachably coupled to the body. The conductive bar 310 may be an entirely-conductive member, or may be a member composed of an inner conductive material, and an outer non-conductive material that covers the inner conductive material.

A socket 320 may be mounted to the body so as to couple one end of the conductive bar 310. The socket 320 is electrically connected to the end region 18' of the conductive unit 18 (refer to FIG. 4).

Here, the socket 320 is preferably formed at the rear case 21 rather than the front case 11, so that a high electromagnetic field formed at the free end of the conductive bar 310 can be spaced from the measuring region (E) in a thickness direction of the portable terminal.

When the conductive bar 310 is mounted to the body, electromagnetic waves occurring from operation of the antenna 17 form a relatively high electromagnetic field at the free end of the conductive bar 310, rather than the end region 18' of the conductive unit 18.

As a result, a high 'E'-field is formed at the free end of the conductive bar 310 far from the audio output unit 14, rather than the end region 18' adjacent to the audio output unit 14. Accordingly, when the conductive bar 310 is mounted to the body, a HAC rating may be enhanced like in the aforementioned embodiments.

Figure 8:
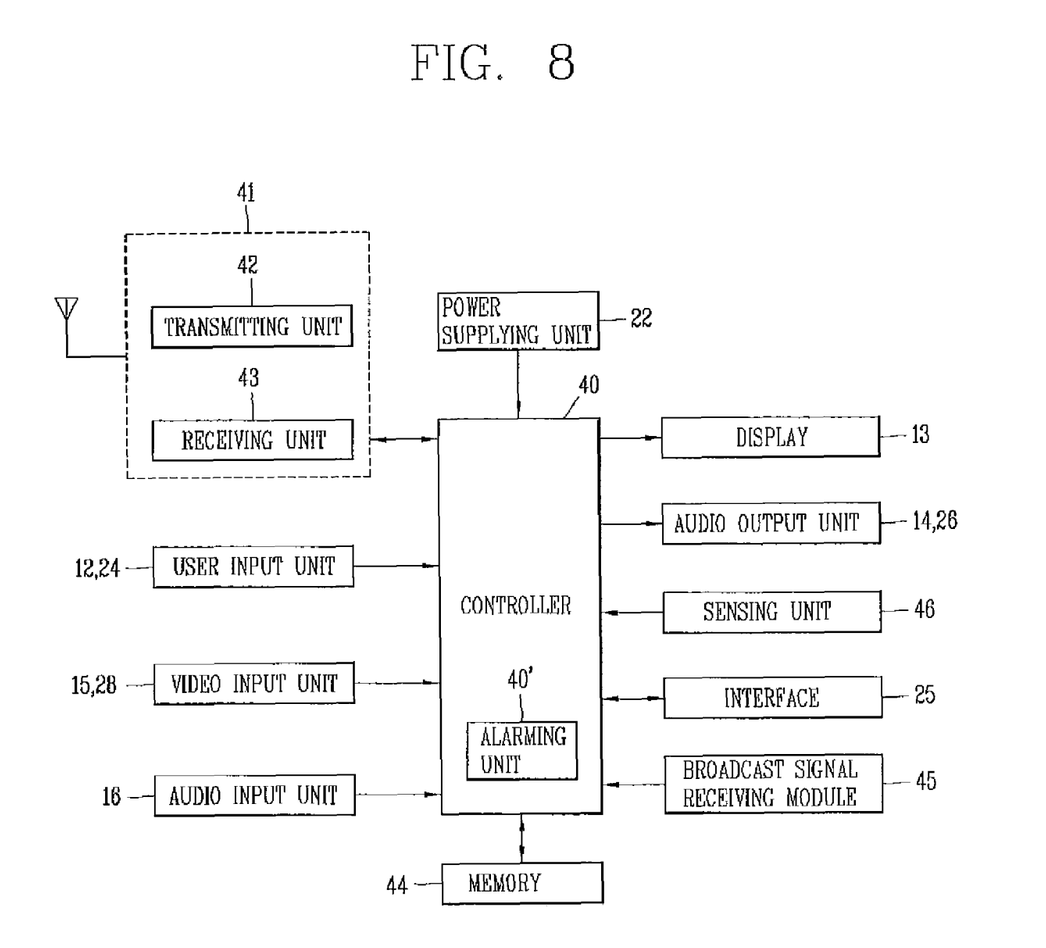
FIG. 8 is a block diagram showing the portable terminal of the present invention.

FIG. 8 is a block diagram showing the portable terminal according to the present invention.

Referring to FIG. 8, the portable terminal according to the present invention comprises a wireless communication module 41, user input units 12 and 24, video input units 15 and 27, an audio input unit 16, a display 13, audio output units 14 and 26, a sensing unit 46, an interface 25, a broadcasting signal receiving module 45, a memory 44, a power supplying unit 22, and a controller 40.

The controller 40 controls an entire operation of the portable terminal. For instance, the controller 40 performs controls and processes relating to voice communication, data communication, video communication, or the like. The controller 40 controls the operation of the portable terminal relating to the present invention as well as the general functions.

The wireless communication module 41 transmits/receives wireless signals to/from a base station through an antenna. For instance, the wireless communication module 141 transmits/receives voice data, text data, image data, and control data under control of the controller 40. The wireless communication module 41 includes a transmitting unit 42 for transmitting signals after a modulation process, and a receiving unit 43 for demodulating received signals.

Figure 1:
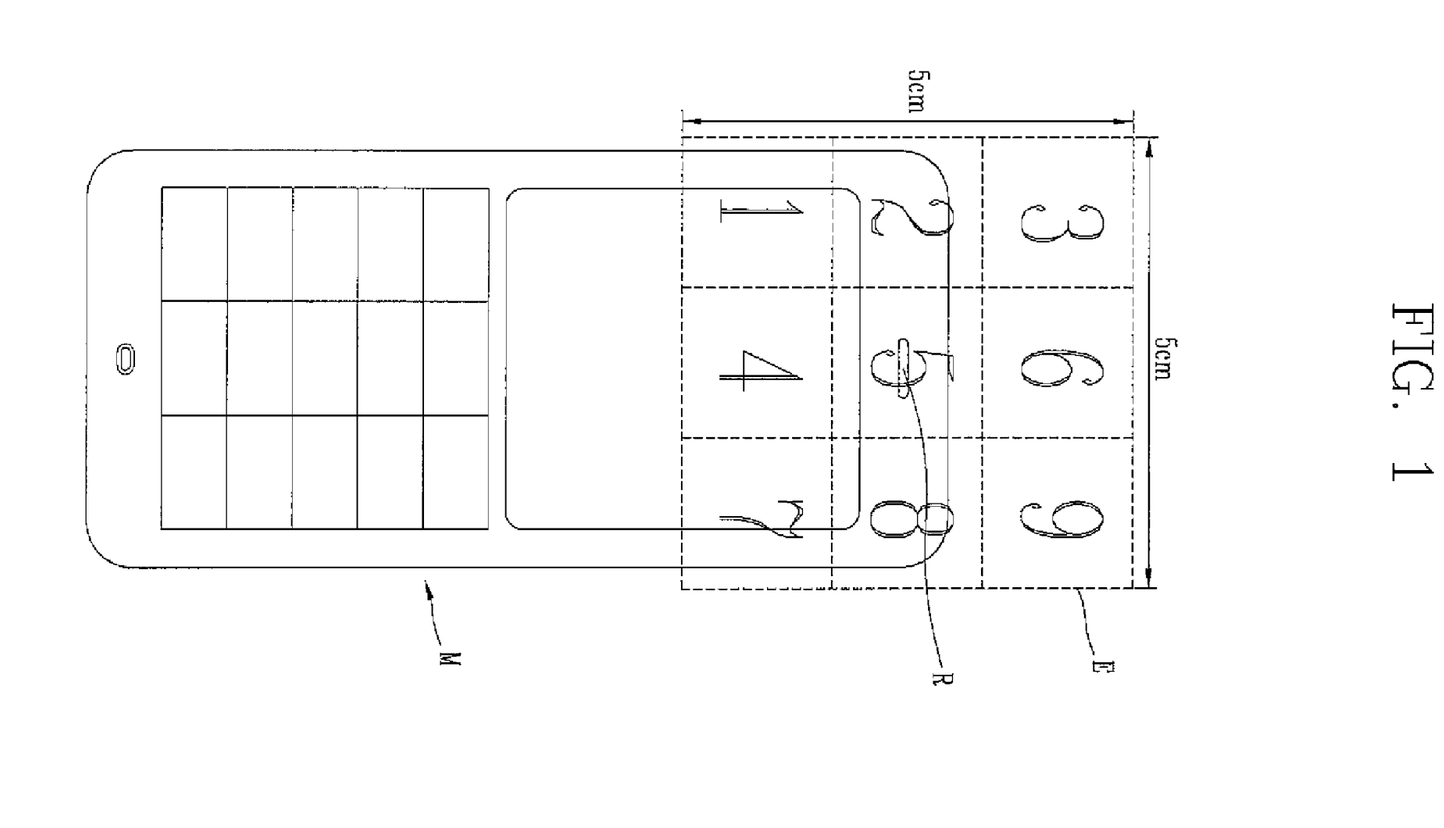
FIG. 1 is a conceptual view to explain how to measure a hearing aid compatibility (HAC) rating for a portable terminal.

The manipulating units 12 and 24 have a configuration shown in FIG. 1, and provide, to the controller 40, key input data input by a user so as to control the operation of the portable terminal. The manipulating units 12 and 24 are composed of dome switches, touch pad (static pressure/capacitance), jog wheels, jog switches, or the like.

Video input units 15 and 27 process image frames such as still images or moving images captured by an image sensor in a video-call mode or a capturing mode. Then, the processed image frames are converted to image data that can be displayed on the display 13.

Image frames processed by the video input units 15 and 27 are stored in the memory 44 under control of the controller 40, or are transmitted to outside of the portable terminal through the wireless communication module 41.

The audio input unit 16 receives an external audio signal through a microphone in a call mode, or a recording mode, or a voice recognition mode, or the like, and then processes the received signal into electric voice data. In the case of a call mode, the processed voice data is converted into data that can be transmitted to the base station through the wireless communication module 41, and then is output to the wireless communication module 41. In the case of a recording mode, the processed voice data is output so as to be stored in the memory 44. The audio input unit 16 may include assorted noise removing algorithms to remove noise occurring while receiving the external audio signal.

The display 13 may output information processed in the portable terminal. For example, when the portable terminal is operating in a phone call mode, the display 13 will provide a User Interface (UI) or a Graphic User Interface (GUI) which includes information associated with the call. As another example, if the portable terminal is in a video call mode or a capturing mode, the display 13 may additionally or alternatively display captured images, or the UI, or the GUI under control of the controller 40. In the case that the display 13 includes a touch screen, the display 13 may be used as an input device as well as an output device.

In a call signal reception mode, a communication mode or a recording mode, a voice recognition mode, a broadcasting signal reception mode, or the like, the audio output units 14 and 26 convert audio data received from the wireless communication module 41, or audio data stored in the memory 44, under control of the controller 40. Then, the audio output units 14 and 26 output the converted data to outside.

The audio output units 14 and 26 output audio signals relating to functions performed in the portable terminal, such as sound indicating a call signal reception, or sound indicating a message reception. The audio output units 14 and 26 include a speaker, a receiver, a buzzer, and so on.

The sensing unit 46 senses a current status of the portable terminal such as an open/close status of the portable terminal, a position of the portable terminal, or whether a user has contacted the portable terminal, thereby generating sensing signals to control the operation of the portable terminal. For instance, when the portable terminal is implemented as a slide phone, the sensing unit 46 senses whether the slide phone has been opened or not, and outputs a result of the sensing to thereby control the operation of the portable terminal. Furthermore, the sensing unit 46 performs sensing functions relating to whether power has been supplied from the power supplying unit 22, or whether the interface 25 has been coupled to an external device, or the like.

The interface 25 interfaces a wire/wireless headset, an external charger, a wire/wireless data port, a card socket (e.g., memory card, SIM/UIM card), or the like, with any types of external devices connected to the portable terminal. The interface 25 transmits data or power received from external devices, to each component in the portable terminal, or transmits data in the portable terminal to the external devices.

The memory 44 may store programs to be processed and controlled by the controller 40, or may temporarily store input/output data (e.g., phonebook, messages, still images, moving images, or the like). The memory 44 may store programs to control the operation of the portable terminal according to the present invention. The memory 44 may be implemented using any type of suitable storage medium including a flash memory type, a hard disk type, a multimedia card micro type, a memory card type (e.g., SD or DX memory), Random Access Memory (RAM), Read-Only Memory (ROM), or the like.

The broadcasting signal receiving module 45 receives broadcasting signals transmitted through satellite or terrestrial wave, and then converts the signals to broadcasting data that can be output to the audio output units 14 and 26, and the display 13, thereby outputting the broadcasting data to the controller 40. The broadcasting signal receiving module 45 receives broadcasting-related additional data (e.g., Electric Program Guide: EPG, channel list, or the like). Broadcasting data and additional data converted by the broadcasting signal receiving module 45 may be stored in the memory 44.

The power supplying unit 22 receives internal or external power, and supplies the power to each component of the portable terminal under control of the controller 40.

Referring to FIGS. 2 to 8, the portable terminal may operate in a call mode in connection with the respective operations of the peak shift units 100, 200 and 300.

According to the present invention, when the peak shift units 100, 200 and 300 are operated (i.e., when the peak shift units 100 and 200 are unfolded from the audio output unit 14 by sliding or rotating, and when the peak shift unit 300 is mounted to the body), the controller 40 may convert the current mode of the portable terminal into a call mode. For this, sensors to sense the operation of the peak shift units 100, 200 and 300 may be mounted to the body.

A hearing aid wearer may receive a call from another party by operating the peak shift units 100, 200 and 300. More specifically, the hearing aid wearer may execute a received call by sliding the peak shift unit 100. As a result, the hearing aid wearer can simply start to perform a call without interference between the portable terminal and his or her hearing aid.

When attempting to perform a call, the peak shift units 100, 200 and 300 may be operated when the portable terminal is in a standby status. In this case, the controller 40 may control numbers to be displayed on the display 13 that displays information input in a touch manner, and a user may input another party's phone number by touching the displayed numbers.

In the present invention, the portable terminal may further comprise an alarming unit 40' informing a user that the peak shift units 100, 200 and 300 have not been operated, at the time of performing a call mode, or at the time of converting the current mode into a call mode.

For instance, when a user attempts to press a call button in a state where the peak shift unit 300 has not been mounted to the body, the alarming unit 40' may output a message to the user through the display 13 or the audio output units 14 and 26.

Furthermore, even while a call is incoming, the alarming unit 40' may inform a user that the peak shift unit 300 has not been mounted to the body.

The alarming unit 40' may be selectively operated, only when a hearing aid wearer sets a high HAC rating through a menu, or the like.

The portable terminal according to the present invention has the following effects.

Firstly, the end region of the conductive portion where the peak region is formed due to electric wave emission in a call mode, may be configured to shift to a position far from the audio output unit, by the peak shift unit. Accordingly, a HAC rating measured centering around the audio output unit may be enhanced.

Secondly, even when a strength of the peak region is not directly controlled, the HAC rating may be enhanced.

Thirdly, the peak shift unit may be operated only in a call mode, whereas the peak shift unit may be restored to the original position in a non-call mode, thereby allowing the portable terminal to always implement a portable characteristic.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A portable terminal, comprising:
a body having an audio output unit on a front surface thereof and an antenna forming an electromagnetic field;
a sliding unit mounted to the body, the sliding unit having a front portion covering a portion of the front surface of the body and a rear portion covering a portion of a rear surface of the body;
a peak shift unit electrically connected to the antenna, for shifting a peak region of the electromagnetic field to a position farther from the audio output unit when the peak shift unit is activated than when the peak shift unit is non-activated; and
a controller configured to place the portable terminal in a call mode when the peak shift unit is activated,
wherein the peak shift unit includes a conductive member having one end connected to the antenna, the conductive member being movable toward and away from the antenna, and the conductive member being mounted at the rear portion of the sliding unit.

2. The portable terminal of claim 1, wherein the body includes a display for visually outputting information, and allowing information to be input in a touch manner.

3. The portable terminal of claim 2, wherein in the call mode, the display is in a status that numbers can be input thereon.

4. The portable terminal of claim 1, wherein when the peak shift unit is activated while a call is incoming, the portable terminal is operated in a call mode.

5. The portable terminal of claim 1, wherein the body further includes an alarming unit configures to provide an indication when the peak shift unit is not in the call mode.

6. The portable terminal according to claim 1, wherein the peak shift unit comprises a contact pin electrically connecting the conductive member and a ground of the body.

* * * * *